(12) United States Patent
Amirnasr et al.

(10) Patent No.: US 12,102,953 B2
(45) Date of Patent: Oct. 1, 2024

(54) FILTER ELEMENT ANALYSIS SYSTEM AND ASSOCIATED METHODS

(71) Applicant: MANN+HUMMEL GmbH, Ludwigsburg (DE)

(72) Inventors: Elham Amirnasr, Durham, NC (US); Andreas Scope, Oberschoena (DE); Matthias Heinzmann, Bayreuth (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 269 days.

(21) Appl. No.: 17/557,464

(22) Filed: Dec. 21, 2021

(65) Prior Publication Data

US 2023/0191301 A1 Jun. 22, 2023
US 2024/0293768 A9 Sep. 5, 2024

Related U.S. Application Data

(63) Continuation of application No. 16/204,497, filed on Nov. 29, 2018, now abandoned.

(51) Int. Cl.
*B01D 46/00* (2022.01)
*B01D 46/42* (2006.01)
*B01D 46/44* (2006.01)

(52) U.S. Cl.
CPC ....... *B01D 46/0086* (2013.01); *B01D 46/009* (2013.01); *B01D 46/429* (2013.01); *B01D 46/442* (2013.01)

(58) Field of Classification Search
None
See application file for complete search history.

(56) References Cited

U.S. PATENT DOCUMENTS

| | | | |
|---|---|---|---|
| 6,091,607 | A | 7/2000 | McKeown et al. |
| 2004/0023419 | A1 | 2/2004 | Kishkovich et al. |
| 2007/0101705 | A1 | 5/2007 | Knitt |
| 2008/0018442 | A1 | 1/2008 | Knitt |
| 2012/0324982 | A1 | 12/2012 | Hocken et al. |
| 2015/0153249 | A1 | 6/2015 | Goulette et al. |
| 2020/0171421 | A1* | 6/2020 | Amirnasr ........... B01D 46/0086 |

FOREIGN PATENT DOCUMENTS

| | | | |
|---|---|---|---|
| JP | 2008051715 A | 3/2008 | |
| KR | 20180017627 A * | 2/2018 | ......... B01D 46/0086 |
| WO | 2015038217 A1 | 3/2015 | |

OTHER PUBLICATIONS

KR20180017627A_ENG (Espacenet machine translation of Shin) (Year: 2018).*

* cited by examiner

*Primary Examiner* — Gabriel E Gitman

(57) ABSTRACT

A filter media analysis system which utilizes particulate buildup to close notches or breaks provided along a passive circuit, wherein closure of the notches results in an activation of the circuit and transmission at a particular frequency which activation and transmission can be correlated to a life cycle point of the filter media.

12 Claims, 9 Drawing Sheets

FILTER ELEMENT ANALYSIS SYSTEM AND ASSOCIATED METHODS

TECHNICAL FIELD

The present disclosure generally relates to the field of filtration systems, and more particularly to particulate filtration through a filter media and a mechanism for determining proper service or replacement schedules of the filtration elements thereof.

BACKGROUND

When filtering a stream of fluid, whether it be air in an HVAC system, cabin air, combustion, air, breathing air, transmission/motor from an oil stream it is often of particular advantage to ensure that downstream fluid being utilized in their respective functions be clean so as to avoid damaging or contamination which can increase service life to a machine, or provide any number of readily apparent advantages. As such it is well understood that in most such circumstances that the various systems utilizing the filtration operate in an optimal manner when the filter elements are regularly replaced or cleaned, and changing or cleaning the filter element prematurely, while ensuring smooth operation can result in unnecessary downtime, excess cost due to replacement cost, or damage to the filter element during unnecessary cleaning operations.

Further, in particular environments, it can often require almost-constant supervision in order to determine precisely when a particular filter element needs replacement or cleaning.

It is then well understood that changing or servicing a filter element too often result in extra downtime, damage to filter elements, and overall costs. Likewise, not changing or servicing at appropriate intervals can lead to damage to the system due to contamination or physical damage.

Currently, filter changes are decided by customer discretion, test data, average mileage or number of months wherein actual replacement or service lives actually vary substantially based on numerous environmental, and use factors or characteristics. When these guidelines may or may not reflect actual filter element state or particle load depending on a wide variety of potential operating conditions. One of the intended benefits of the present application seeks to optimize filter element servicing or replacement, while reducing unnecessary downtime.

SUMMARY OF THE INVENTION

Contemplated herein is a passive filter element monitoring system configured to aide in the proper timing and scheduling of filter element cleaning and maintenance. It will be appreciated that particulate counts in the air can vary greatly depending on environments, various weather conditions, or any number of additional factors, as will be appreciated by those having skill in the art. Additionally, cleaning operations can often lead to unintentional damage and thus require premature replacement of these filter elements which is a source of undue cost. Additionally, changing the filter elements too often can result in large amounts of wasted man hours and unnecessary equipment downtime.

The passive filter element monitoring system of the present invention will be discussed primarily with regard to air filter elements for purposes of illustration; however, it will be appreciated that other filter elements, such as oil or other fluid filter elements, can similarly benefit from various aspects of the present invention. As such, aspects of the present invention can be similarly applied to other filtration systems in various environments, including HVAC and other filtration systems.

The filter element monitoring system according to the invention comprises a filter element having a filter media and a passive circuit provided on the filter media, wherein the passive circuit has at least one notch provided in the circuitry thereof being configured to provide a first state of the passive circuit in a clean state. Further the filter element monitoring system comprises a transmitter and receiver configured to emit a signal thus providing power to the passive circuit and configured to receive information from the passive circuit. A stream of fluid is configured to be directed through the filter media, wherein the filter media is configured to remove particulates from the stream and the media is adapted to collect a buildup of particulates until a contaminated state in which the filter media is deformed or has reached a particular load of particulates. In the contaminated state the circuitry is configured to provide a second state of the passive circuit. The first state of the passive circuit can be an open state in which the receiver receives no signal from the passive circuit.

It should be appreciated that in the first state the passive circuit provides a first signal at a first frequency and the second state of the passive circuit provides a second signal at a second frequency, wherein the first frequency is different than the second frequency, i.e. a change of a loading state of the filter element can be determined by reading out the passive circuit.

The passive circuit can comprise or be formed as a Radio Frequency Identification means, i.e. RFID tag, or alternatively a near-field communication tag, i.e. NFC tag, wherein the circuitry of the RFID or NFC tag can be provided with one or more gaps or breaks in the circuitry with air passages provided therethrough, wherein the gaps or breaks are eventually filled with particulates which allow for the completion of the circuit, wherein upon circuit completion the RFID or NFC tag is activated and results in a signal or other indication which notifies a system or operator that the filter element needs to be serviced or changed.

In some embodiments the notch, in particular in the form of gaps or breaks, can be provided in series or parallel, and can be provided singularly or in a plurality having varying shapes, orientations, etc.

The second signal can indicate that the filter element is at or near capacity for holding particulates and that the filter element should be replaced.

In a preferred embodiment the filter element can exhibit filter media that is pleated and the passive circuit can be located within a pleat of the filter media. In another embodiment the load of particulates on the filter media causes an increase in pressure on the filter element, wherein the increase in pressure causes deformation of at least one pleat of the pleated filter media, wherein the passive circuit comprises a first side having an open circuit and second side having a conductive material with a fold there between, wherein the first side and the second side are located on opposing sidewalls of a pleat. Deformation of the pleat causes the first side to contact with the second side and the conductive material closes the open circuit. It should be appreciated that in this embodiment the previously open passive circuit can be closed by pleat deformation.

In an alternative embodiment the passive circuit can be located on a sidewall of a pleat and a conductive material is located on a opposing sidewall of the pleat, wherein deformation of the pleat causes the conductive material to contact the previously open passive circuit to close. The conductive material can be printed on the pleat surface for example or installed into the pleat in form of a conductive foil, e.g. a metal foil strip.

Of course the filter element can have more than one passive circuits, for instance 3-8 or even more.

Advantageously a plurality of passive circuits are provided on various location of the filter element, in particular in different pleats that can be distributed over the filter element. By broadly spreading the passive circuits over an area of the filter element that is as large as possible a well averaged loading measure can be collected.

The notch is preferably configured to collect a buildup of particulates until a bridge forms over the notch in a contaminated state so that the passive circuit is closed and transitions from its first to its second state.

An amount of particles that forms the bridge especially causes a change of a frequency of the first signal, wherein the frequency of the first signal corresponds to a percentage of maximum load of the filter element or life cycle of the filter element. Though, this embodiment of the invention enables it not only to determine if the filter element has been loaded up to a certain threshold level but to continuously monitor its loading state.

The passive circuit preferably can be a RFID tag.

Another aspect of the invention is a method of monitoring a filter element and comprises the steps of: providing a filter element monitoring system according to the invention; connecting a controller to the transmitter and receiver; and providing a signal to a user or operator when the passive circuit begins responding to the transmitter signal. In another embodiment the method can comprise the step of measuring a frequency response of the passive circuit in response to the signal of transmitter; and correlating a plurality of frequencies to a filter media state.

Yet another aspect of the invention relates to a filter element comprising: a filter media; at least one passive circuit provided on the filter media; the passive circuit having a notch provided in the circuitry thereof being configured to provide a first state of the passive circuit in a clean state. A stream of fluid is configured to be directed through the filter media, wherein the filter media is configured to remove particulates from the stream and is configured to collect a buildup of particulates until a contaminated state in which the filter media is deformed or has reached a particular load of particulates. In the contaminated state the circuitry is configured to provide a second state of the passive circuit.

In a preferred embodiment the filter media is pleated and the passive circuit is located within a pleat of the filter media.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein.

DETAILED DESCRIPTION OF THE INVENTION

Figure 1:
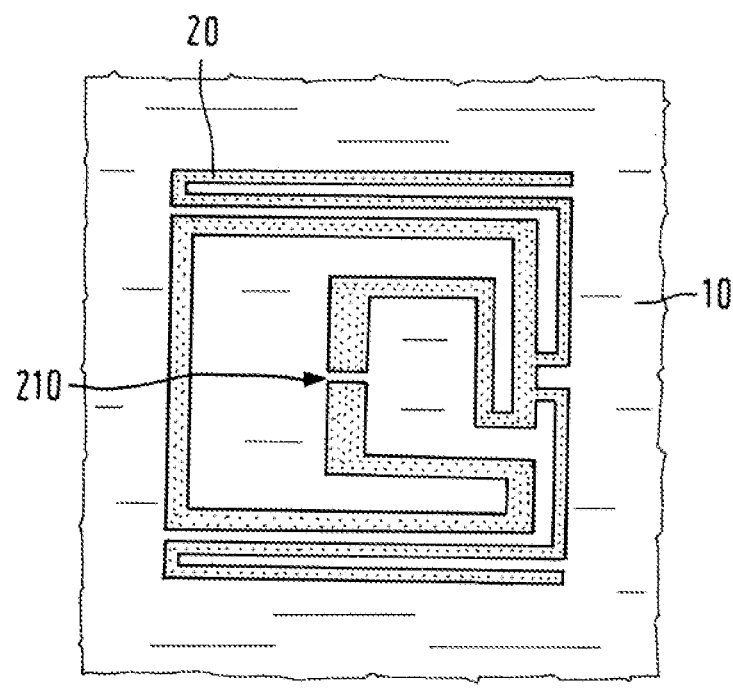
FIG. 1 illustrates a top view of an exemplary notched passive circuit as provided on a filter media.

It will be appreciated by those having skill in the area of internal combustion engines, harvesting, motors, ventilation systems etc., that proper filtration of lubricants as well as air can increase the life of particular motor or system greatly by reducing dust buildup and other contaminants from interfering with the operation of the machinery, motors, system elements, etc.

In order to aid in the protection of these systems, as well as the maximization of operation time and reduction of cost, a filter element, and particularly a filter media is contemplated herein which incorporates the use of a passive circuit such as a Radio Frequency Identification Tag, herein referred to as and RFID tag which is provided with certain features to the circuitry that provide a designated response to particulate build up on the filter media. While the present invention is discussed in relation to RFID technology, it will be appreciated that other passive circuitry, such as NFC, or other frequency responsive non-powered or passive circuits can also be provided with similar features which allow for similar particulate detection.

In particular, the present invention relates to the provision of a passive circuit and the attachment thereof to a filter media, such as a fibrous air filter membrane. The passive circuit can then be designed to have intentional gaps or breaks provided in the circuitry which collect particulates in a manner similar to the filter media itself, such that when the gap or break is bridged by particulates that the circuit corresponding to the particular gap or break is closed by the bridging particulates and then becomes responsive, turns on, and in some manner then begins communicating or operating thus signaling a particular state of the filter media.

It will be appreciated that passive circuits such as an RFID tag are simple device consisting of an antenna and microchip. RFID tags can be completely passive therefore, the antenna is used to both power up the RFID device when interrogated with a reader as well as transmit data. The antenna transmits information stored on the chip back to the reader which can be interpreted on a computer, tablet or cell phone. To send data, RFID tags typically operate at fixed ultrahigh frequency bandwidths.

As such a controller of a particular system, such as a vehicle, or an HVAC system can be provided with an RFID transmitter which continuously transmits at a frequency designed to power up the RFID tag, wherein when the tag turns on, because the gap of the circuitry has been bridged, the turning on, and receipt of data by the controller from the RFID tag can serve as an indication of a need to service or replace the filter media.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

FIG. 1 illustrates a top view of an exemplary notched passive circuit 20 on as provided on a filter media 10. The passive circuit is provided with a gap or a notch as illustrated by 210.

Figure 2:
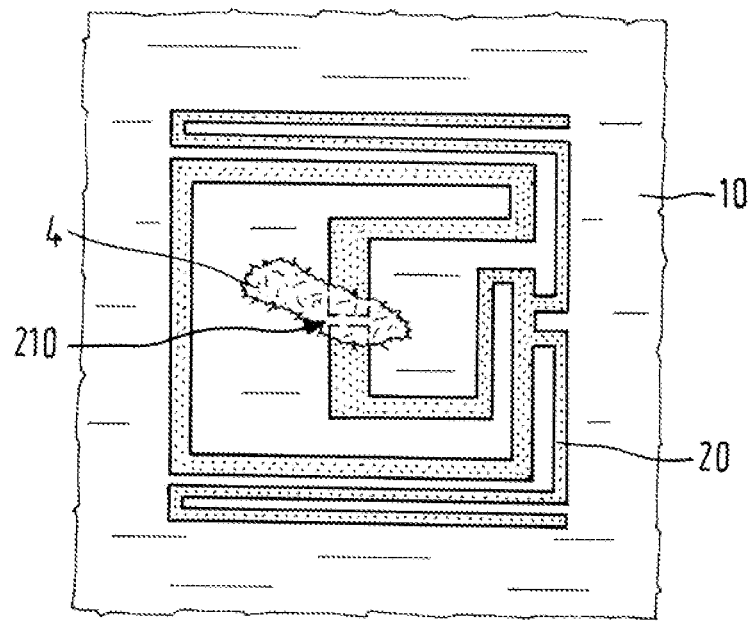
FIG. 2 illustrates a top view of an exemplary notched passive circuit being having the notch being bridged by particulates.

FIG. 2 illustrates particulates 4 bridging the notch of passive circuit 20 which will result in the passive circuit beginning to respond to the RFID transmitter at a particular frequency. In some instances, the mere fact that the RFID tag begins to respond at all can be an indication of a specific particulate load, or, in some alternative embodiments, the degree of notch bridging can result in repeatable frequency response changes in the passive circuit wherein a given particulate load can be correlated to a given frequency response.

Figure 3:
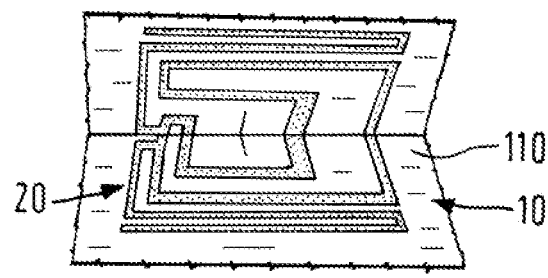
FIG. 3 illustrates a perspective view of an exemplary notched passive circuit being installed into an exemplary pleat of filter media.
Figure 4:
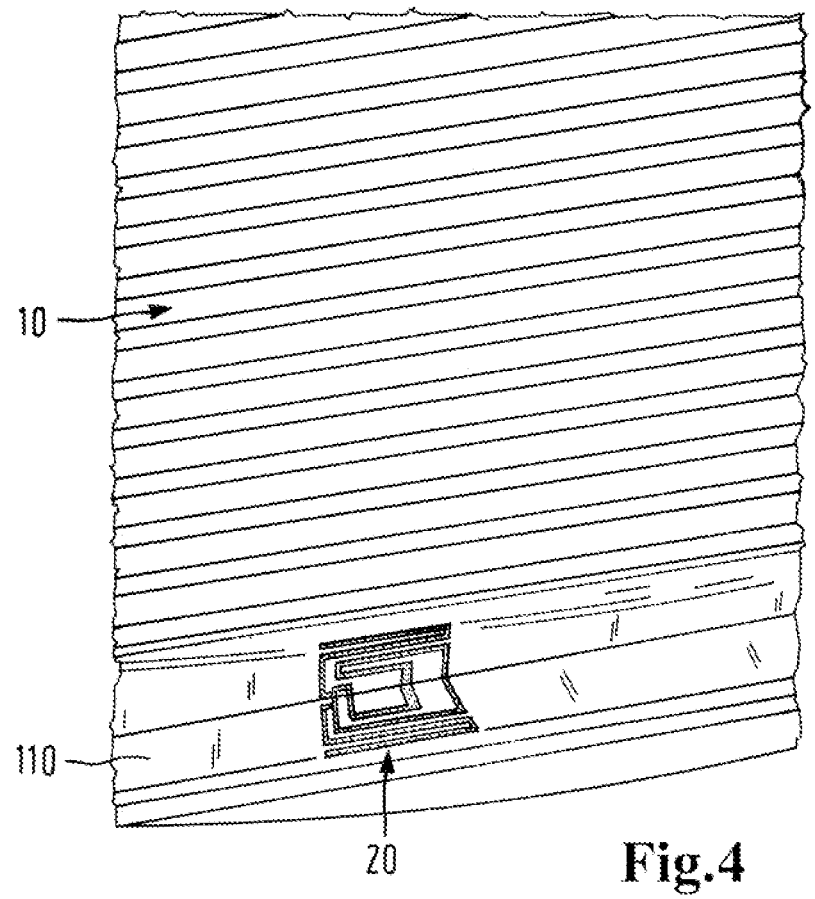
FIG. 4 also illustrates a perspective view of an exemplary notched passive circuit being installed into an exemplary pleat of filter media.

FIGS. 3-4 illustrates a perspective view of an exemplary notched passive circuit 20 being installed into an exemplary pleat 110 of a clean or un-contaminated filter media 10. The passive circuit has two sides, a first side and a second side, wherein the first side is located on one pleat surfaces and the second side is located on an opposing pleat surface. One of the sides of the open circuit has the notch/gap. The open passive circuit can be either closed by the accumulation of particles as described above or by pleat deformation wherein deformation of the pleat causes the first side to contact with the second side and a conductive material foreseen on the side of the passive circuit that doesn't have the notch/gap closes the previously open circuit.

Figure 5A:
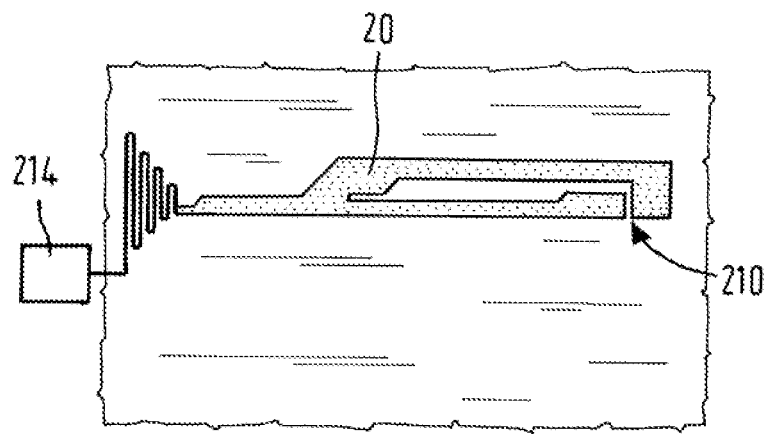
FIGS. 5A-B illustrate various perspective views of an exemplary notched passive circuit being installed into an exemplary pleat of filter media and the behavior of the passive circuit as particulates bridge the notch of the passive circuit.
Figure 5B:
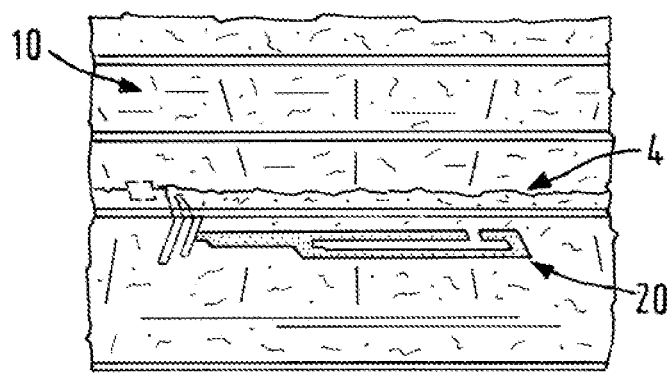

FIGS. 5A-B illustrate various perspective views of an exemplary notched passive circuit being installed into an exemplary pleat of filter media and the behavior of the passive circuit as particulates bridge the notch of the passive circuit wherein the passive circuit 20 is inactive, as illustrated in FIGS. 5A-B, until after use, the notch becomes bridged by particulates removed from the flow passing through the filter media 10. As such, the passive circuit 20 which is illustrated as an RFID tag, can have a chip 214 provided within the circuit which can have an identification number stored therein which is transmitted to the RFID antenna when the passive circuit becomes active.

Once active, the identification number and other data stored on the chip can be read and recognized by the RFID antenna. In response to the receipt of data from the RFID tag a corresponding signal can be generated by a controller which then can provide a user or operator with information regarding particle load on the filter media. Such a signal can include a degree of degradation, a life cycle prediction, or merely an indication that the media needs to be changed.

Figure 6A:
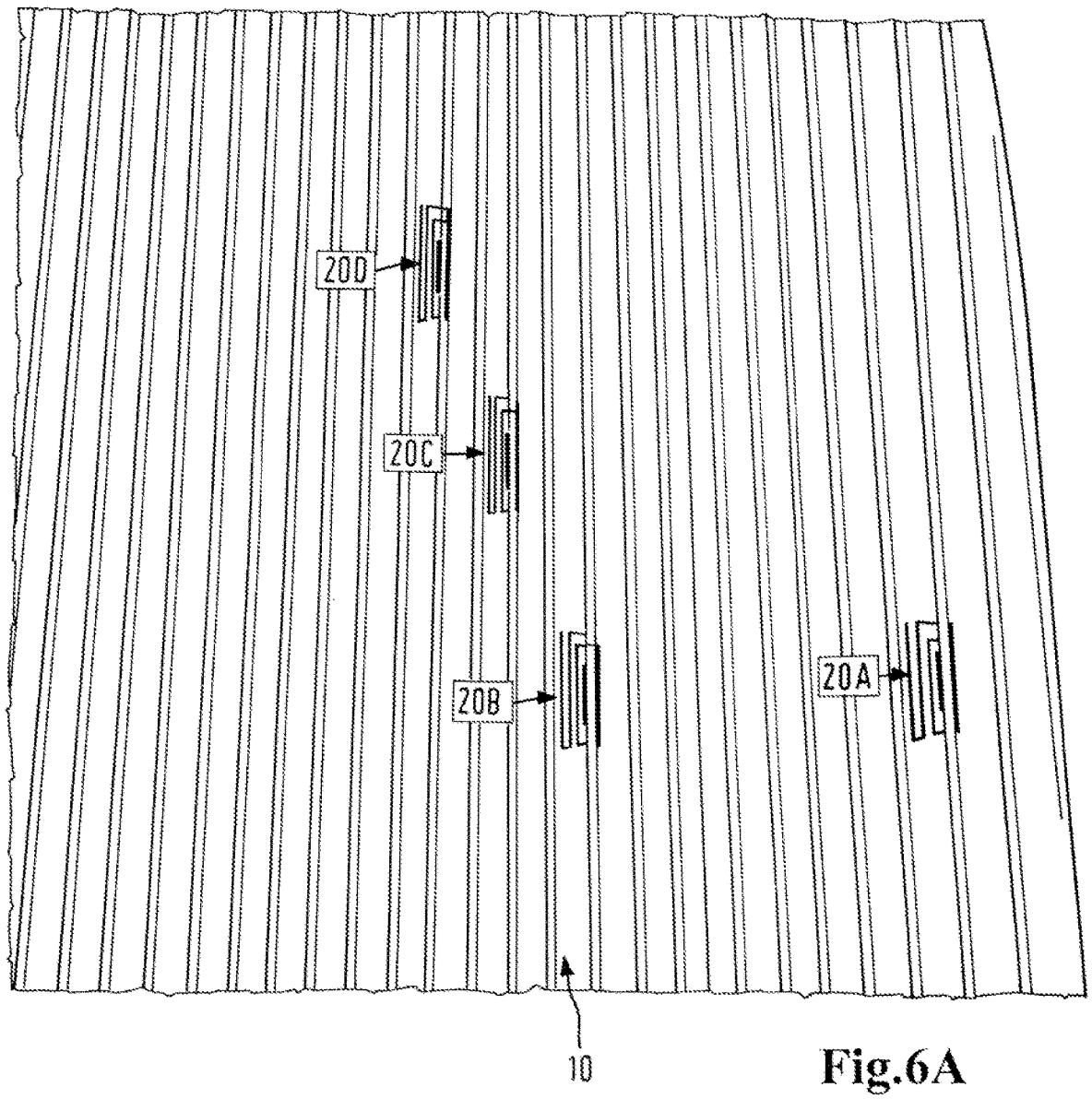
FIG. 6A-B illustrate various perspective views of an exemplary filter media being provided with a plurality of notched passive circuit being installed into an exemplary pleat of filter media.
Figure 6B:
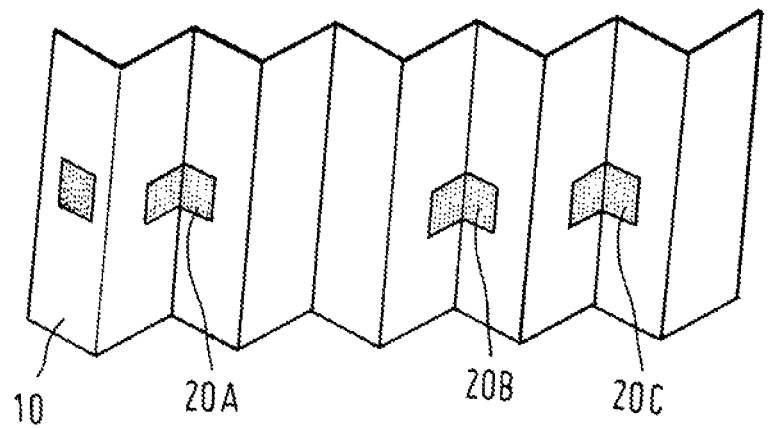

FIG. 6A-B illustrate various perspective views of an exemplary filter media being provided with a plurality of notched passive circuit 20A-D being installed into an exemplary pleat of filter media 10. In these embodiments, the numerous RFID tags can have identical properties such that they are designed to activate at the same time, but increases reliability as it provides more potential successful connections in response to particulate load. Alternatively, a plurality of RFID tags can be provided wherein each tag has different properties, such as notch width or depth. By varying the notch width or depth, and being able to recognize the ID numbers of each RFID tag as they activate, incremental filter media life cycle points can be detected throughout the entire life cycle. For example, each RFID tag can have incrementally larger notches or gaps which require more particulates to fill the notch, wherein the smaller notches will become bridged easier than the larger notches. As such, a particular notch size, and associated bridge, can be correlated to a given percentage of a maximum load, or life cycle, i.e. 25%, 50%, 75% and 100%. In this manner, the controller can provide information to the user/operator regarding where in the life/service cycle a particular filter is, and the user/operator can adjust maintenance accordingly.

The gap widths can vary in size from 0.03 mm to 25 mm and result in repeatable correlations to a relative particle load in the filter media. It will be further appreciated that the length of the various widths can also be varied so as to increase the reliability of the bridge connections. The width and length of the gap can then be described as an area and can range from 1 $mm^2$ to 25 $mm^2$. Holes or apertures in the filter media next to, or below the gaps in the RFID circuits can be similarly sized from 1 $mm^2$ to 25 $mm^2$. In some cases, those apertures in the filter media can be smaller. A single or plurality of holes or apertures in the filter media directly beneath and/or the gap help the flow of air to pass through or around the gap, thus providing mechanism for allowing particles to build up over time and complete the circuit. Additionally, the gap width can have a varying profile wherein the gap width changes over its length. The variation could be expressed as linear or complex functions which vary the gap width, depth along the length of the gap so as to change the behavior of the particulate bridge over time.

Figure 7:
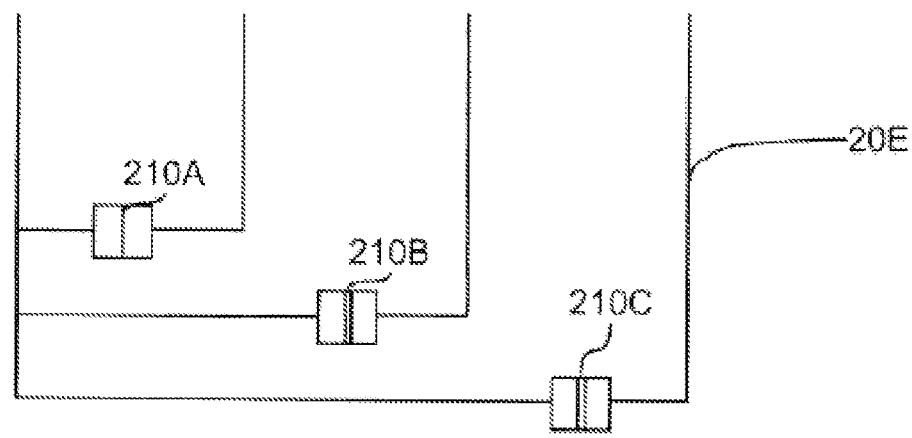
FIG. 7 illustrates a circuit view of an exemplary notched passive circuit being installed having various circuit loops with varying notches having alternative properties.

FIG. 7 illustrates an alternative notched passive circuit 20E which instead has various circuit loops with varying notches having alternative properties built into the same RFID tag. It will be appreciated that the circuit illustrated here is provided with various circuit branches or tamper loops which have notches 210A-C which have varying widths or other properties which affect the rate at which particulates fill the respective notches. In particular, 210A can be a relatively thin notch, 210B can be an intermediate notch, and 210 C can be a more substantial or wider notch. In such an instance the specific notch width or property can be correlated to a specific particle load reflective of the state of the filter media on which the RFID tag resides, for example 33%, 67%, and 100% load or other parameter of service life.

Figures 8A, 8B:
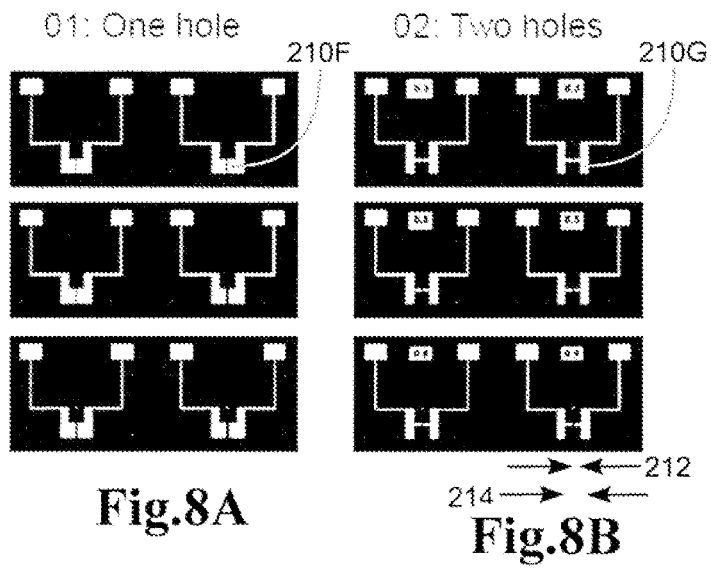
FIGS. 8A-F illustrate various top views of various notched passive circuits.

FIGS. 8A-F illustrate various top views of various notched passive circuit configurations. In particular FIG. 8A illustrates a notch 210F which has a singular notch with a constant notch width. Alternatively, FIG. 8B illustrates a double gap, or a stepped gap 210 G which has a narrow portion 212 and a wider portion 214, wherein bridging of the narrower gap 212 can be designed so as to respond at a specific frequency, but wherein the frequency changes as the larger or wider portion 214 of the gap is bridged.

Figures 8C, 8D:
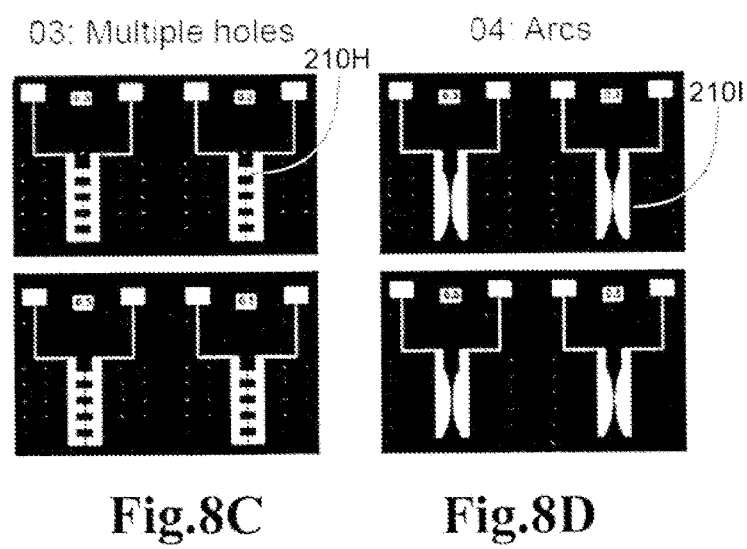
Figure 8E:
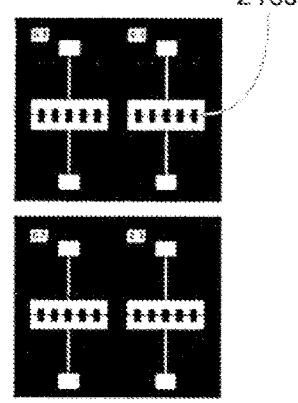
Figure 8F:
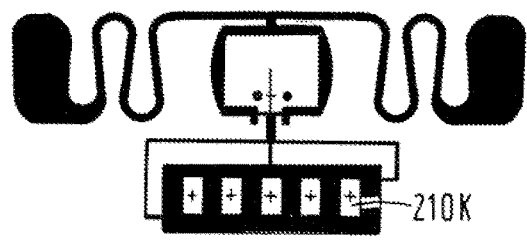

In yet additional embodiments, such as shown in FIGS. 8C and 8E and 8F, a plurality of parallel arranged gaps, 210H or 210J or 210K respectively, can be provided in varying or consistent gap widths. In an instance, wherein all the gaps are the same width, the reliability that at least one gap will be bridged and create or allow a response of the passive circuit increases. In other embodiments, such as when the notches have a varying gap distance, as each gap is incrementally bridged by particulates a frequency response of the passive circuitry can be reliably detected through the addition of each parallel branch. As such, a corresponding particulate load can be correlated to each frequency response of the passive circuit in the parallel notch arrangement.

FIG. 8D illustrates how the notch 2101 can be provided with a varying gap profile such that the gap distance changes along its height or length so as to provide a varying degree in the strength or the conductance of the bridge material over time which can also be measured as a function of frequency response of the passive circuitry.

Figure 9A:
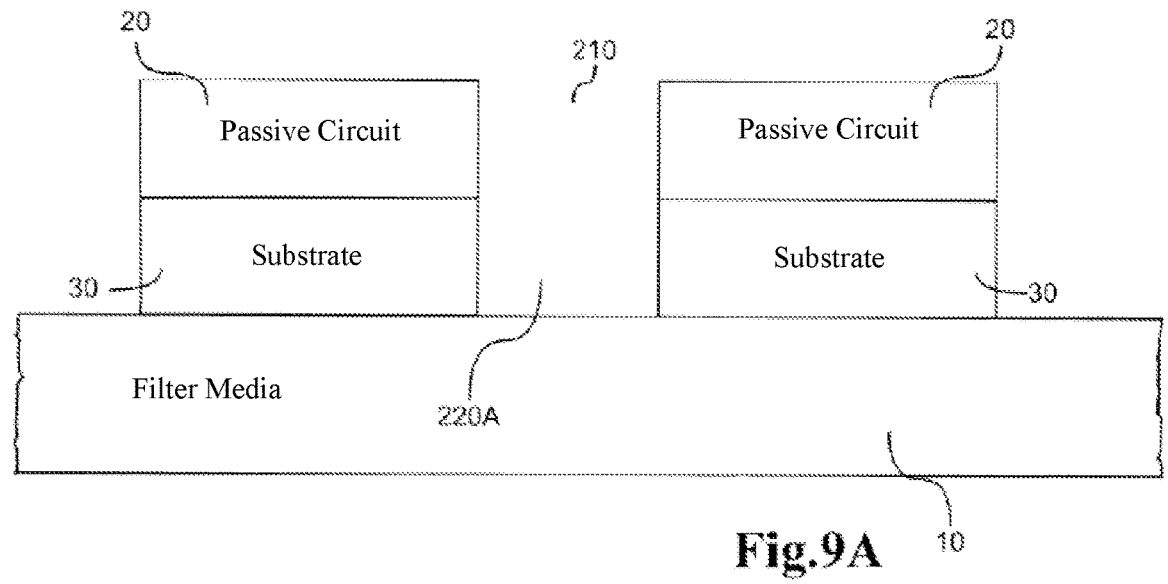
FIGS. 9A-B illustrate various side cross-sectional views of various configurations and relationships between the passive circuit material and a substrate on which it is provided.
Figure 9B:
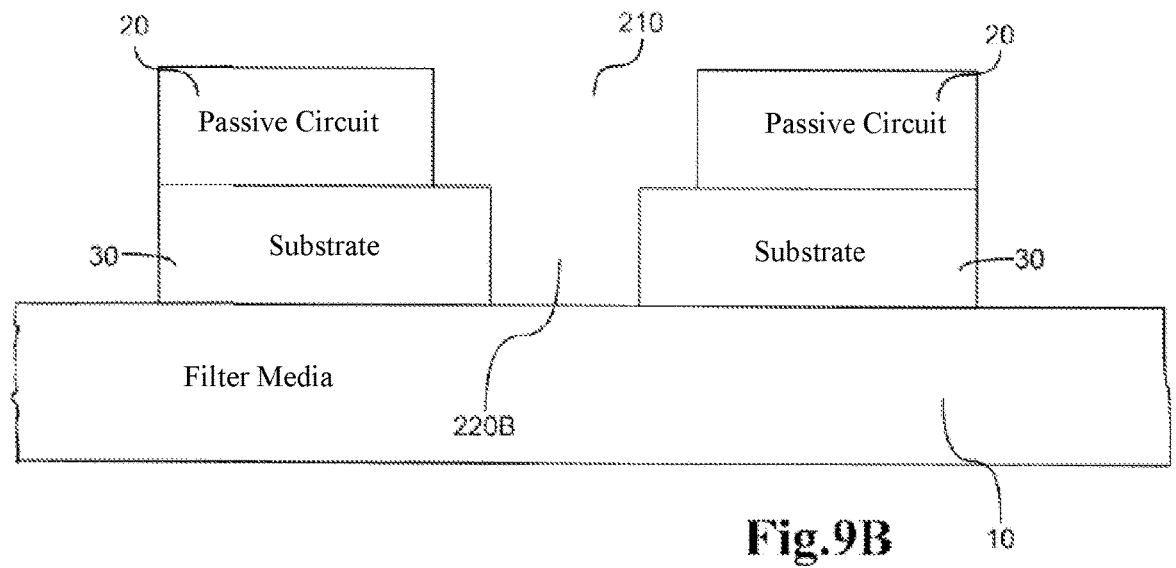

FIGS. 9A-B illustrate various side cross-sectional views of various configurations and relationships between the passive circuit 20 and a substrate 30 on which the passive circuit 20 is provided, as circuitry is typically provided on some sort of substrate. However, it will be understood that in the various embodiments discussed above, that the gaps provided in the passive circuitry should also pass through the substrate onto which the circuitry is printed so as to allow the stream of fluid/air being filtered to pass through the gap in a similar relationship and having similar properties as the filter media itself so as to reliably collect particulates from the stream instead of having the stream and the embedded particulates pass around the entire passive circuit or RFID tag. In this manner particulates can be gathered from the stream passing through the notch in the same way as particulates are gathered from filter media so as to ensure a correlation between the particulates creating the bridge in the notch, and the particulate load in the filter media.

FIG. 9A illustrates an embodiment wherein the gap 220A between the two sides of the substrate 30 correspond in shape and distance to the gap 210 provided in the passive circuit 20 such that the stream of fluid can pass through the gaps 210 and 220A and through the filter media 10 onto which the passive circuit or substrate is affixed. Particulates will then be removed from the stream and begin bridging the gap 210 until the passive circuit loop is complete and is responsive. It is important for the function of the invention that the gap 210, 220A extends through both the passive circuit 20 and the substrate 30 that works as a carrier layer for the material of the passive circuit.

FIG. 9A illustrates a similar but alternative embodiment wherein the gap 220B between the two sides of the substrate 30 are stepped or different than that of the gap 210 provided in the passive circuit 20. In this manner, a slightly restricted flow of fluid to be filtered passes through the two gaps but the particulate buildup time or properties can be varied and altered so as to change the buildup of particulate bridging matter.

Both the embodiment from FIGS. 9A and 9B can be produced with a laser cutting step, wherein the gap 220A, 220B is cut into the substrate 30 either directly adjacent to the material of the passive circuit (so called touch cut, see FIG. 9A) or with a small distance between the material of the passive circuit and the substrate 30 (so called edge cut, see FIG. 9B).

In yet additional embodiments the RFID tag response frequency can also be effected by particulate buildup on the circuitry itself.

Figure 10A:
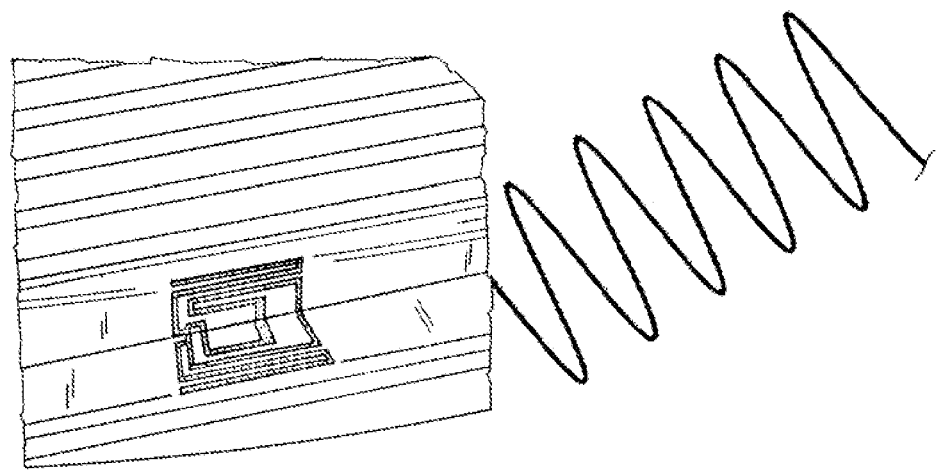
FIGS. 10A-B illustrate various perspective views and associated wavelength properties of passive circuits as the filter media, the passive circuit, and any notches provided in the circuit become loaded with particulates.
Figure 10B:
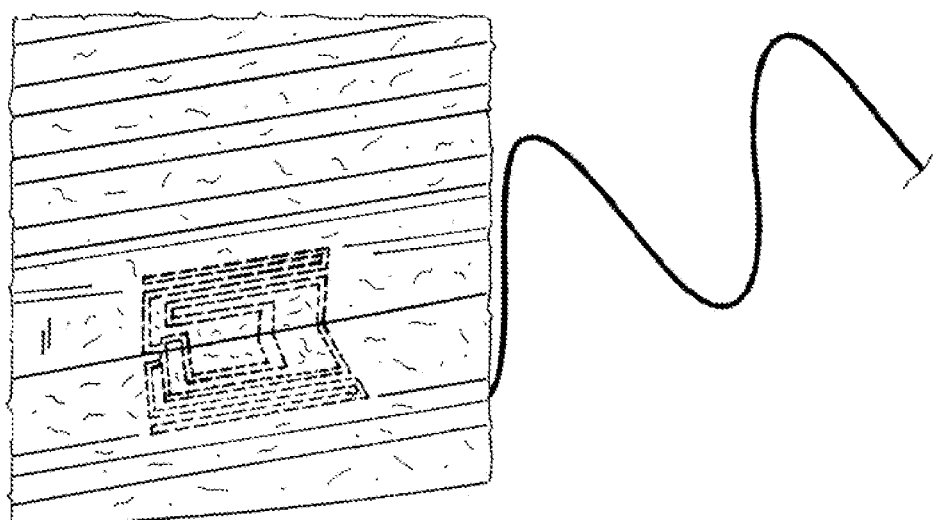

FIGS. 10A-B illustrate various perspective views and associated wavelength properties of passive circuits as the filter media, the passive circuit, and any notches provided in the circuit become loaded with particulates wherein the wavelength changes between the clean filter media and RFID tag as illustrated in FIG. 10A as opposed to the contaminated filter media and RFID tag as illustrated in FIG. 10B.

In yet additional embodiments, and in particular environments, the passive circuitry can also be caused to degrade due to particular gasses in the air, or merely by a dampening effect of particulates being stuck thereto. As such, the frequency response of the passive circuit can be reliably correlated to a specific life cycle point and alerts can be generated when said frequencies are detected.

Figure 11A:
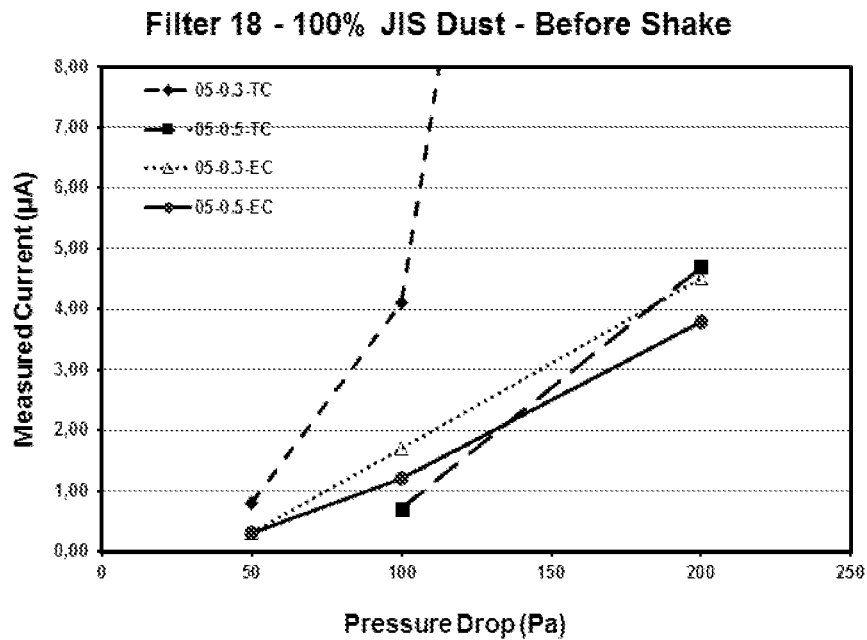
FIGS. 11A-B illustrate various graphical representations of the frequency response of the passive circuit, as related to pressure differential across the filter media.
Figure 11B:
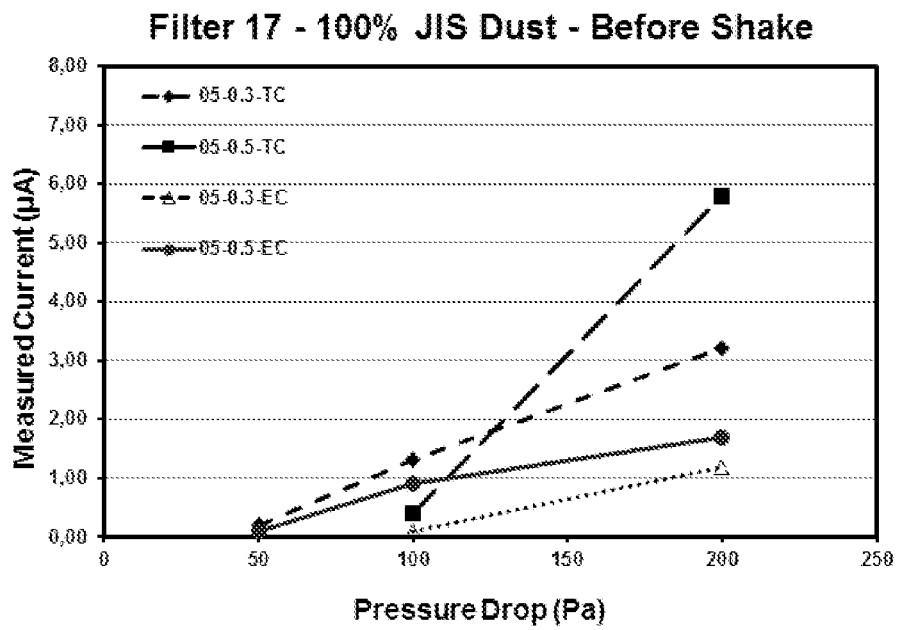

FIGS. 11A-B illustrate various graphical representations of the frequency response of the passive circuit, as related to pressure differential across the filter media. It will be appreciated that this illustration is reflective of particulate load because as the passages through the media are clogged by particulates, the pressure differential across the filter media will increase. However, RFID frequency correlation to particle load is a new concept as enabled by the disclosure above.

Both the diagram in FIGS. 11A and 11B include various graphs. Number "05" refers to tag design "05" from FIG. 8 while "0.3" and "0.5" define the gap or notch width. TC stands for touch cut, EC for edge cut and represent a slightly varying production technique that is explained in more detail under FIGS. 9A and 9B. JIS-Dust is a certain test dust that is used by the person skilled in the art usually to test the performance of filtration systems. The y-axis represents an electric current that is proportional to a frequency response of the passive circuit, wherein a frequency response can be transformed to a certain current by appropriate measurement equipment. The measurements results from FIGS. 11A and 11B have been achieved by measuring two different types of filter elements, wherein it is remarkable that for all tested combinations of gap widths and production methods a significant correlation between pressure drop (loading) and measured current (frequency response) could be observed, wherein the touch cut (TC) embodiments tend to show a more significant correlation.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention. Additionally, any features, structures, components, method steps which are discussed in reference to any one of the aforementioned embodiments are readily adaptable for use into and with any features of the other alternative embodiments discussed therein, with the understanding that one of ordinary skill in the art will be capable of assessing the ability of the various embodiments disclosed and be capable of making such adaptations.

The invention claimed is:

1. A filter element monitoring system comprising:
a filter media;
a passive circuit provided on the filter media;
the passive circuit having a notch in the form of at least one gap or break provided in the circuitry thereof, the notch being configured to provide a first state of the passive circuit in a clean state of the filter media;
wherein a stream of a fluid is configured to be directed through the filter media,
wherein the filter media is configured to remove particulates from the stream;
wherein the filter media is pleated and the passive circuit is located in a pleat of the filter media;
wherein the filter media is configured to collect a buildup of particulates until a contaminated state occurs in which at least one pleat of the filter media is deformed by the buildup or has reached a particular load of particulates,
wherein in the contaminated state of the filter media the circuitry is configured to provide a second state of the passive circuit;
wherein the buildup of particulates on the filter media causes an increase in pressure on the filter media of a filter element,
wherein the increase in pressure causes the deformation,
wherein the passive circuit comprises
a first side having an open circuit with the notch and
a second side having a conductive material with a pleat fold between the first side and the second side, and
wherein the deformation of the at least one pleat causes the first side to contact with the second side and the conductive material closes the open circuit.

2. The filter element monitoring system, according to claim 1, the system comprising:
a transmitter and a receiver;
the transmitter being configured to emit a signal thus providing power to the passive circuit, and
the receiver being configured to receive information from the passive circuit.

3. The filter element monitoring system of claim 2, wherein
the passive circuit is provided on a substrate or carrier, and
wherein the notch extends both through a material of the passive circuit and through the substrate or carrier.

4. The filter element monitoring system of claim 2, wherein
the first state of the passive circuit is an open state in which the receiver receives no signal from the passive circuit.

5. The filter element monitoring system of claim 2, wherein
the first state of the passive circuit provides a first signal at a first frequency; and
the second state of the passive circuit provides a second signal at a second frequency,
wherein the first frequency is different from the second frequency.

6. The filter element monitoring system of claim 5, wherein
the second signal indicates that the filter media of the filter element has reached its capacity for holding particulates indicating that the filter element should be replaced.

7. The filter element monitoring system of claim 2, wherein
a plurality of passive circuits are provided on various locations of the filter media of the filter element, wherein the passive circuits each have incrementally larger notches or gaps.

8. The filter element monitoring system of claim 2, wherein
the notch is configured to collect the buildup of particulates until a bridge forms over the notch in the contaminated state.

9. The filter element monitoring system of claim 8, wherein
an amount of particles that forms the bridge causes a change of a frequency of a first signal,
wherein the frequency of the first signal corresponds to a percentage of a maximum load of the filter media of the filter element or a life cycle of the filter element.

10. The filter element monitoring system of claim 2, wherein
the passive circuit is a RFID tag.

11. A method of monitoring a filter element, the method comprising the steps of:
providing a filter element monitoring system comprising:
a filter media,
a passive circuit provided on the filter media,
the passive circuit having a notch in the form of at least one gap or break provided in the circuitry thereof, the notch being configured to provide a first state of the passive circuit in a clean state of the filter media,
wherein a stream of a fluid is configured to be directed through the filter media,
wherein the filter media is configured to remove particulates from the stream,
wherein the filter media is pleated and the passive circuit is located in a pleat of the filter media;
wherein the filter media is configured to collect a buildup of particulates until a contaminated state occurs in which at least one pleat of the filter media is deformed by the buildup or has reached a particular load of particulates,
wherein in the contaminated state of the filter media the circuitry is configured to provide a second state of the passive circuit,
wherein the buildup of particulates on the filter media causes an increase in pressure on the filter media of the filter element,
wherein the increase in pressure causes the deformation,
wherein the passive circuit comprises
a first side having an open circuit with the notch; and
a second side having a conductive material with a fold between the first side and the second side,
wherein the deformation of the at least one pleat causes the first side to contact with the second side and the conductive material closes the open circuit;
connecting a controller to a transmitter and a receiver; and
providing a signal to a user or operator when the passive circuit begins responding to a signal emitted by the transmitter when the open circuit is closed.

12. The method of monitoring a filter element of claim 11, further comprising:
   measuring a frequency response of the passive circuit in response to the transmitter signal; and
   correlating a plurality of frequencies to respective states of the filter media.

* * * * *